United States Patent
Ibrahim et al.

(10) Patent No.: US 9,468,850 B2
(45) Date of Patent: Oct. 18, 2016

(54) SYSTEM AND METHOD FOR OPTICAL PLAYER TRACKING IN SPORTS VENUES

(71) Applicant: LIVEBARN INC., Montreal (CA)

(72) Inventors: Peter Ibrahim, Westmount (CA); Farrel Miller, Westmount (CA)

(73) Assignee: LIVEBARN INC., Montreal, Quebec (CA)

( * ) Notice: Subject to any disclaimer, the term of this patent is extended or adjusted under 35 U.S.C. 154(b) by 4 days.

(21) Appl. No.: 14/739,936

(22) Filed: Jun. 15, 2015

(65) Prior Publication Data

US 2016/0101358 A1    Apr. 14, 2016

Related U.S. Application Data

(60) Provisional application No. 62/062,457, filed on Oct. 10, 2014.

(51) Int. Cl.

| | |
|---|---|
| A63F 13/5258 | (2014.01) |
| A63F 13/42 | (2014.01) |
| A63F 13/46 | (2014.01) |
| A63F 13/56 | (2014.01) |
| A63F 13/65 | (2014.01) |
| A63F 13/77 | (2014.01) |
| G06F 3/048 | (2013.01) |
| A63F 13/828 | (2014.01) |

(52) U.S. Cl.
CPC .......... *A63F 13/5258* (2014.09); *A63F 13/42* (2014.09); *A63F 13/46* (2014.09); *A63F 13/56* (2014.09); *A63F 13/65* (2014.09); *A63F 13/77* (2014.09); *A63F 13/828* (2014.09); *G06F 3/048* (2013.01)

(58) Field of Classification Search
CPC .... A63F 13/5258; A63F 13/42; A63F 13/46; A63F 13/77; A63F 13/828; A63F 13/65; A63F 13/56; G06F 3/048
See application file for complete search history.

(56) References Cited

U.S. PATENT DOCUMENTS

| | | | |
|---|---|---|---|
| 6,270,433 B1 * | 8/2001 | Orenstein | A63B 24/0021 473/467 |
| 6,567,116 B1 * | 5/2003 | Aman | A63B 24/0021 348/164 |

(Continued)

FOREIGN PATENT DOCUMENTS

| | | |
|---|---|---|
| CA | 2343743 A1 | 12/1999 |
| CA | 2351230 A1 | 6/2000 |

(Continued)

*Primary Examiner* — Jay Patel
*Assistant Examiner* — Irfan Habib
(74) *Attorney, Agent, or Firm* — Merchant & Gould P.C.

(57) ABSTRACT

A system and method optically track players and automatically capture broadcastable video of a sporting event within a venue. The system includes at least one fixed tracking camera, a remote-controlled broadcast camera, and a scoreboard camera, with each of the components being in communication with a processing system. The method involves dividing the venue into zones of interest, optically tracking individual players in the zones of interest, identifying player groups in the zones of interest, determining a zone of interest containing the most players, analyzing player activity in the zone of interest with the most players, selecting a current gameplay scenario corresponding to the player activity from a set of predetermined gameplay scenarios, and adjusting the pan, tilt and zoom of a broadcast camera according to the current gameplay scenario.

19 Claims, 11 Drawing Sheets

(56) References Cited

U.S. PATENT DOCUMENTS

| | | | |
|---|---|---|---|
| 6,707,487 B1 * | 3/2004 | Aman | A63B 24/0003 348/169 |
| 6,725,107 B2 * | 4/2004 | MacPherson | A63B 71/0669 273/459 |
| 6,950,123 B2 | 9/2005 | Martins | |
| 7,483,049 B2 | 1/2009 | Aman et al. | |
| 8,170,413 B2 * | 5/2012 | Pace | H04N 5/2251 396/329 |
| 8,339,456 B2 * | 12/2012 | Eledath | G06K 9/209 348/154 |
| 8,456,518 B2 * | 6/2013 | Pace | H04N 13/0025 348/42 |
| 8,611,723 B2 | 12/2013 | Aman | |
| 8,622,795 B2 * | 1/2014 | Edis | A63B 24/0006 36/39 |
| 8,698,898 B2 * | 4/2014 | Porcino | H04N 5/23203 348/159 |
| 8,704,904 B2 * | 4/2014 | Boyle | H04N 5/23203 348/211.99 |
| 8,786,415 B2 * | 7/2014 | Cavallaro | A63B 24/0021 340/323 R |
| 8,854,594 B2 | 10/2014 | Densham et al. | |
| 8,964,052 B1 * | 2/2015 | Wooley | H04N 5/232 348/14.03 |
| 8,965,898 B2 | 2/2015 | Aman et al. | |
| 8,989,880 B2 * | 3/2015 | Wohl | G06K 7/10227 700/91 |
| 9,007,476 B2 * | 4/2015 | Glover | H04N 5/232 348/211.5 |
| 9,025,021 B2 * | 5/2015 | Aman | A63B 24/0003 348/135 |
| 9,055,226 B2 * | 6/2015 | Densham | H04N 5/23296 |
| 9,094,615 B2 | 7/2015 | Aman et al. | |
| 9,269,154 B2 * | 2/2016 | Huang | H04N 21/64322 |
| 9,298,986 B2 | 3/2016 | Ferlatte et al. | |
| 9,319,641 B2 * | 4/2016 | Milstead | H04N 7/183 |
| 9,363,488 B2 * | 6/2016 | Mate | H04N 7/181 |
| 9,375,628 B2 * | 6/2016 | DeAngelis | A63B 24/0021 |
| 9,398,213 B1 * | 7/2016 | Cronin | H04N 5/23229 |
| 2002/0030742 A1 * | 3/2002 | Aman | A63B 24/0021 348/169 |
| 2003/0049590 A1 * | 3/2003 | Feldbau | A63B 24/0021 434/251 |
| 2004/0194129 A1 * | 9/2004 | Carlbom | H04N 7/181 725/32 |
| 2005/0070349 A1 * | 3/2005 | Kimura | A63F 13/10 463/4 |
| 2007/0279494 A1 | 12/2007 | Aman et al. | |
| 2009/0046152 A1 * | 2/2009 | Aman | A63B 24/0021 348/157 |
| 2010/0026809 A1 * | 2/2010 | Curry | H04N 5/222 348/157 |
| 2010/0134614 A1 | 6/2010 | Aman | |
| 2011/0173235 A1 | 7/2011 | Aman et al. | |
| 2013/0120123 A1 * | 5/2013 | Aman | A63B 24/0021 340/323 R |
| 2013/0182119 A1 | 7/2013 | Eledath et al. | |
| 2013/0300832 A1 * | 11/2013 | Hohteri | H04N 5/262 348/46 |
| 2014/0376874 A1 | 12/2014 | Aman et al. | |
| 2015/0189243 A1 * | 7/2015 | Cucco | G06T 7/20 348/157 |
| 2016/0008695 A1 | 1/2016 | Aman et al. | |

FOREIGN PATENT DOCUMENTS

| | | |
|---|---|---|
| CA | 2467545 A1 | 5/2003 |
| CA | 2563478 A1 | 10/2005 |
| CA | 2662136 A1 | 3/2008 |
| CA | 2736750 A1 | 3/2010 |
| CA | 2804705 A1 | 1/2012 |
| CA | 2814294 A1 | 10/2014 |

* cited by examiner

SYSTEM AND METHOD FOR OPTICAL PLAYER TRACKING IN SPORTS VENUES

This application claims benefit of U.S. Ser. No. 62/062,457, filed 10 Oct. 2014 and which application is incorporated herein by reference. To the extent appropriate, a claim of priority is made to the above disclosed application.

FIELD OF THE INVENTION

The present invention relates to optical tracking, and more particularly to zone-based optical tracking for automatically capturing broadcastable video of a sporting event within a venue.

BACKGROUND

Recording and broadcasting sporting events is a very common practice at the professional level. Spectators are able to experience events which they could not otherwise attend in person, and revisit exciting moments from past events. This opens up the event to a much wider audience, increasing the potential viewership and benefitting both the team and league. Spectators watching the event live can also have their experience augmented by gaining additional vantage points and by being able to see replays of notable moments. Similarly, players and coaches benefit by being able to revisit and study important plays in order to improve their tactics.

Typically, a quality broadcast of a sporting event requires a significant amount of equipment and manpower. Depending on the type of event, 20 or more cameras can be spread out throughout the venue, many of which must be manually operated by a human cameraman to follow the game action. The feeds from each camera are received at a central control room where several operators select the appropriate feed to best portray the action unfolding in the game. The feed must be edited on the fly to produce a broadcastable product which spectators can follow on their television, computer, or mobile device.

Disadvantageously, the high cost of producing a quality broadcast makes such a practice unaffordable at lower levels of sport. Minor professional leagues resort to using fewer cameras and having a lower quality broadcast. Semi-professional, junior, youth and amateur leagues often cannot afford to record or broadcast games at all, leaving the burden on individual spectators and coaches to film matches if they wish to revisit and study them.

Several efforts have been made in order to make the broadcasting of sporting events more accessible. Most of these efforts involve automating much of the process in order to reduce the amount of human labor required. In particular, specialized systems have been developed which employ computer-controlled cameras to track play in a game and automatically generate a broadcastable feed.

For example, US 2010/0026809 discloses the use of transceivers, accelerometers, transponders and/or RADAR detectable elements embedded within player equipment to individually track the location of players in three dimensions. Positioning information is fed to a computer system which controls the pan, tilt and zoom of 2D cameras at various positions to capture the gameplay.

Another example is U.S. Pat. No. 6,567,116 which also discloses the tracking of players in three dimensions. The system employs the use of frequency-selective reflective patches, stickers or tape affixed to player equipment in order to act as a marker. Tracking cameras dispersed throughout the venue detect the reflected radiation in order identify and locate marked objects and players. The position information is subsequently fed to a computer system which can separate the marked objects from their background. A related patent, U.S. Pat. No. 7,483,049, discloses the use of such a tracking system to direct multiple fixed, adjustable side-view cameras for capturing and recording the playing eras.

The systems of the prior art are disadvantageously still too expensive to be accessible to all levels of sports. Although less manpower is required to operate these systems, they require additional equipment, such as multiple tracking cameras, embedded tracking devices, or reflective patches, which increases the cost and complexity of the system. Additionally, fully automated systems of the prior art rely on the viewer to choose a desired viewing angle, and therefore cannot produce a high quality video broadcast which gives the best view of a game without human intervention.

There is therefore a need for an improved player tracking system for use in sports venues which reduces overall cost while being able to automatically produce a high quality video broadcast of a sporting event without human intervention and with reduced equipment cost.

SUMMARY

According to an aspect of the invention, a method for automatically capturing broadcastable video of a sporting event within a venue is provided. The method includes the steps of: dividing the venue into a plurality of zones of interest; optically tracking individual players in the venue by determining respective positions of the individual players within the zones of interest using at least one fixed tracking camera; based on the respective positions of the individual players, performing a cluster analysis to identify player groups within the zones of interest; determining a given one of the zones of interest containing the most number of individual players; analyzing activity of the individual players and player groups within the given one of the zones of interest to select a current gameplay scenario corresponding to said activity, said current gameplay scenario being selected from a predetermined set of gameplay scenarios; based on the current gameplay scenario, adjusting a pan, tilt or zoom of a broadcast camera in real-time, thereby changing a field of view of the broadcast camera and capturing the broadcastable video of the sporting event.

In an embodiment, the current gameplay scenario is selected based on a current position, speed or direction of at least one of the individual players or at least one of the player groups in relation to the given one of the zones of interest.

In an embodiment, the method includes identifying individual players or player groups transitioning between adjacent zones of interest, and selecting the current gameplay scenario based on a current position, speed, or direction of the individual players or player groups transitioning between the adjacent zones.

In an embodiment, the method includes predicting a transition of the individual players or player groups between first and second adjacent zones, and analyzing the activity of the individual players and player groups within both the first and second zones in order to select the current gameplay scenario.

In an embodiment, optically tracking the individual players includes the steps of: extracting foreground blobs from frames of tracking video captured by the at least one fixed tracking camera; determining locations of the foreground blobs based on their positions within the frames of the tracking video; correlating each of the foreground blobs to a respective one of the individual players; and maintaining a list of tracked players, each tracked player in the list being associated with a predetermined number of last known locations of the player.

In an embodiment, correlating the foreground blobs includes matching the location of a foreground blob to a player in the list having a last known location closest to the foreground blob, and if a match is found, updating the list so that the last known location associated with the player corresponds to the location of the foreground blob, and if a match is not found, adding a new tracked player to the list with a last known location corresponding to the location of the foreground blob.

In an embodiment, extracting foreground blobs from frames of tracking video captured by the at least one fixed tracking camera includes subtracting sequential frames of the tracking video to obtain a difference image, and extracting the foreground blobs from the difference image by performing the steps of: applying a threshold on the difference image to obtain a binary image of the foreground blobs on a background; blurring the binary image to remove noise; and running a contouring algorithm on the binary image to extract the blobs.

In an embodiment, the method includes identifying moving blobs corresponding to moving players and stationary blobs corresponding to stationary players. Moving blobs are extracted from the difference image and the stationary blobs are extracted from a single frame of the tracking video.

In an embodiment, selecting the current gameplay scenario includes matching the activity of the individual players and player groups with a predetermined pattern associated with a particular gameplay scenario in the predetermined set of gameplay scenarios.

In an embodiment, the method involves dividing the venue such that the zones of interest correspond to zones of a playing field within the venue.

In an embodiment, the method includes the step of calibrating the at least one fixed tracking camera by mapping a tracking region on a playing field within the venue, the tracking region being a region within which tracking video is used to optically track the individual players, and outside of which the tracking video is ignored.

In an embodiment, the individual players are tracked using a plurality of fixed tracking cameras, and the method includes the steps of normalizing tracking data across the plurality of tracking cameras, and merging tracking data from across the plurality of tracking cameras in order to track the individual players globally within the venue.

In an embodiment, the method includes performing a cluster analysis on the position of individual players to identify a global group of players within the venue, and selecting the gameplay scenario based on a current position, speed or direction of the global group.

In an embodiment, the method includes the steps of capturing scoreboard video and compositing said scoreboard video on the broadcastable video, the scoreboard video comprising video of a scoreboard within the venue.

In an embodiment, the method includes the step of adjusting the pan, tilt or zoom of the broadcast camera such that the field of view is bounded to contain a leftmost player, a rightmost player, a topmost player and a bottommost player within the given one of the zones of interest or within the venue.

In an embodiment, the method includes the step of broadcasting the broadcastable video as a live feed over a network.

A further embodiment of the method can include any combination of the above-mentioned embodiments.

According to an aspect of the invention, a system for automatically capturing broadcastable video of a sporting event within a venue is provided. The system includes at least one fixed tracking camera, a broadcast camera and a processing system. The at least one fixed tracking camera is configured to capture tracking video of players in the venue. The broadcast camera is configured to capture the broadcastable video of the sporting event, and is remotely controllable to adjust its pan, tilt or zoom. The processing system is operatively coupled to the at least one tracking camera and the broadcast camera. The processing system is configured to: divide the venue into a plurality of zones of interest; optically track individual players in the venue by determining respective positions of the individual players within the zones of interest using the at least one fixed tracking camera; based on the respective positions of the individual players, perform a cluster analysis to identify player groups within the zones of interest; determine a given one of the zones of interest containing the most number of individual players; analyze activity of the individual players and player groups within the given one of the zones of interest to select a current gameplay scenario corresponding to said activity, said current gameplay scenario being selected from a predetermined set of gameplay scenarios; and based on the current gameplay scenario, adjust a pan, tilt or zoom of the broadcast camera in real-time, thereby changing a field of view of the broadcast camera and capturing the broadcastable video of the sporting event.

In an embodiment, there is a plurality of tracking cameras, and each of the plurality of tracking cameras is assigned to capture tracking video of a particular one of the plurality of zones of interest in the venue.

In an embodiment, the at least one tracking camera includes an optical tracking module. The optical tracking module is configured to: extract foreground blobs from frames of tracking video captured by the at least one fixed tracking camera; determine locations of the foreground blobs based on their positions within the frames of the tracking video; and transmit coordinates of the locations of the foreground blobs to the processing system, said coordinates being transmitted without also transmitting the tracking video to the processing system.

In an embodiment, the system includes a scoreboard camera operatively coupled to the processing system, the scoreboard camera being configured to capture scoreboard video of a scoreboard within the venue. The processing system is configured to composite the scoreboard video on the broadcastable video.

A further embodiment of the system can include any combination of the above-mentioned embodiments.

According to an aspect of the invention, a non-transitory machine-readable medium carrying one or more sequences of instructions is provided. When executed by one or more processors operatively connected to at least one tracking camera and a remote-controllable broadcast camera in a venue during a sporting event, the instructions cause the one or more processors to carry out the steps of: dividing the venue into a plurality of zones of interest; optically tracking individual players in the venue by determining respective positions of the individual players within the zones of interest using the at least one tracking camera; based on the respective positions of the individual players, performing a cluster analysis to identify player groups within the zones of interest; determining a given one of the zones of interest containing the most number of individual players; analyzing activity of the individual players and player groups within the given one of the zones of interest to select a current gameplay scenario corresponding to said activity, said current gameplay scenario being selected from a predetermined set of gameplay scenarios; based on the current gameplay scenario, adjusting a pan, tilt or zoom of the broadcast camera in real-time, thereby changing a field of view of the broadcast camera and capturing the broadcastable video of the sporting event.

DETAILED DESCRIPTION

What follows describes preferred embodiments of aspects of the present invention. These are of but many ways to implement the invention. As such, the examples provided should not be taken as to limit the scope of the invention in any way.

System

Figure 1:
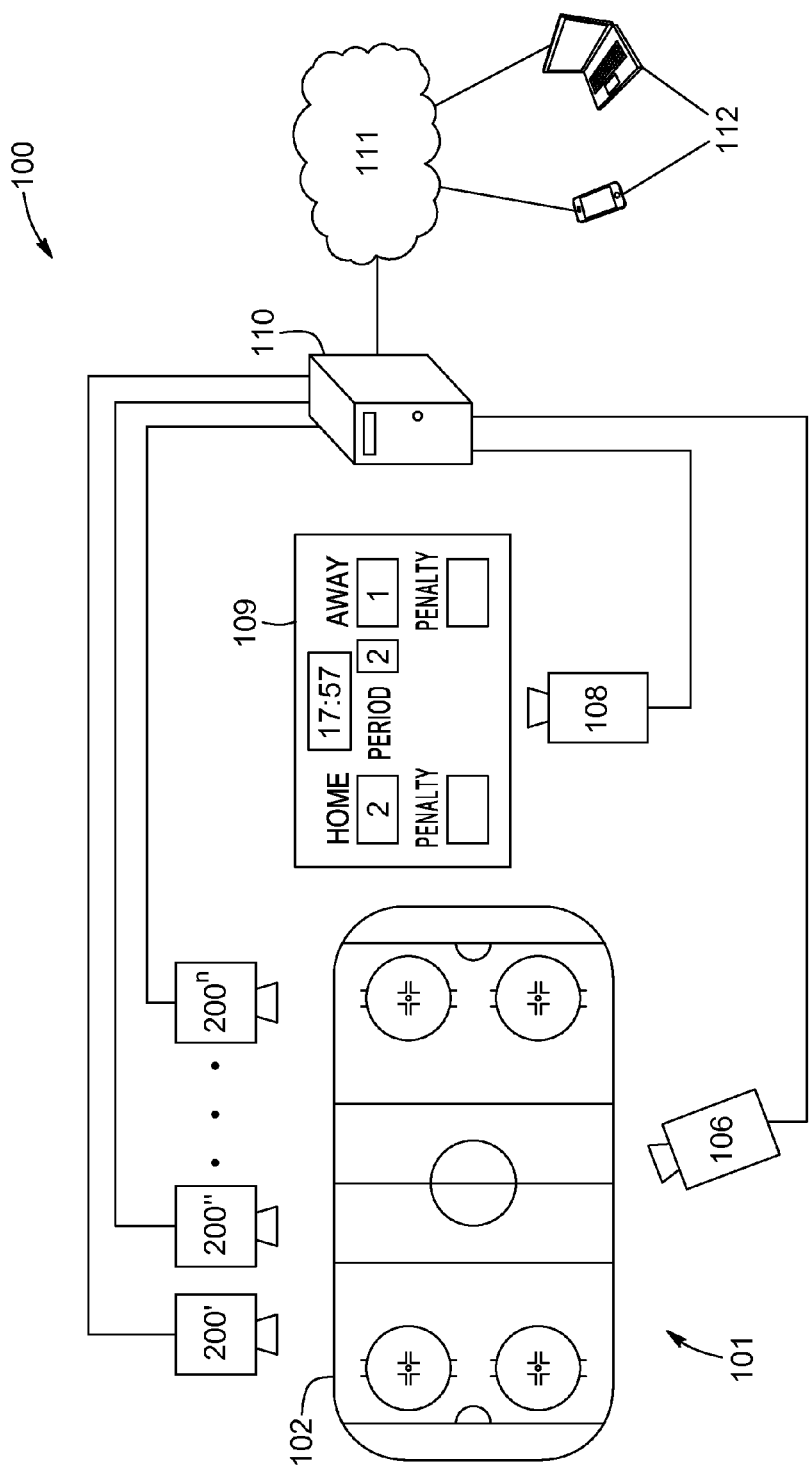
FIG. 1 is a schematic of a system for automatically capturing broadcastable video of a sporting event within a venue, according to an embodiment.

According to an aspect of the invention, a system for automatically capturing broadcastable video of a sporting event within a venue is provided. The system is configured to track players within a venue, record game action, and broadcast a video feed of the game action to an audience. Referring to FIG. 1, an embodiment of the system 100 is illustrated schematically. The system 100 is installed in a sporting venue 101, in this case a hockey arena. Other types of sporting venues are also possible, such as football, soccer or baseball stadiums for example. The sporting venue 101 includes a playing field 102, in this case a hockey rink. In other embodiments, other types of playing fields are possible, such as a basketball court, or soccer, football or baseball fields. Typically, the sporting venues 101 include other elements such as spectators and resting areas for players. They can also include a scoreboard 109 for visibly displaying the score of the game.

The system 100 includes at least one fixed tracking camera 200 facing the playing field 102. The at least one tracking camera 200 is said to be fixed in that it is positioned and calibrated in a particular location, and is not designed to be moved. In other words, the field of view (FOV) of the at least one tracking cameras is preferably static, in that the at least one tracking camera cannot be panned or tilted. In the illustrated embodiment, there are three fixed tracking cameras 200, but in other embodiments more or fewer tracking cameras can be provided. In the present embodiment, the tracking cameras 200 are spaced equidistant on one side of the playing field 102. They are also positioned above and away from the edge of the playing surface at a distance to get the optimal coverage based on the tracking camera's 200 horizontal and vertical FOVs. In the present embodiment, each tracking camera preferably covers approximately one-third of the playing field 102, however there can be overlaps in their field of views.

Figure 3A:
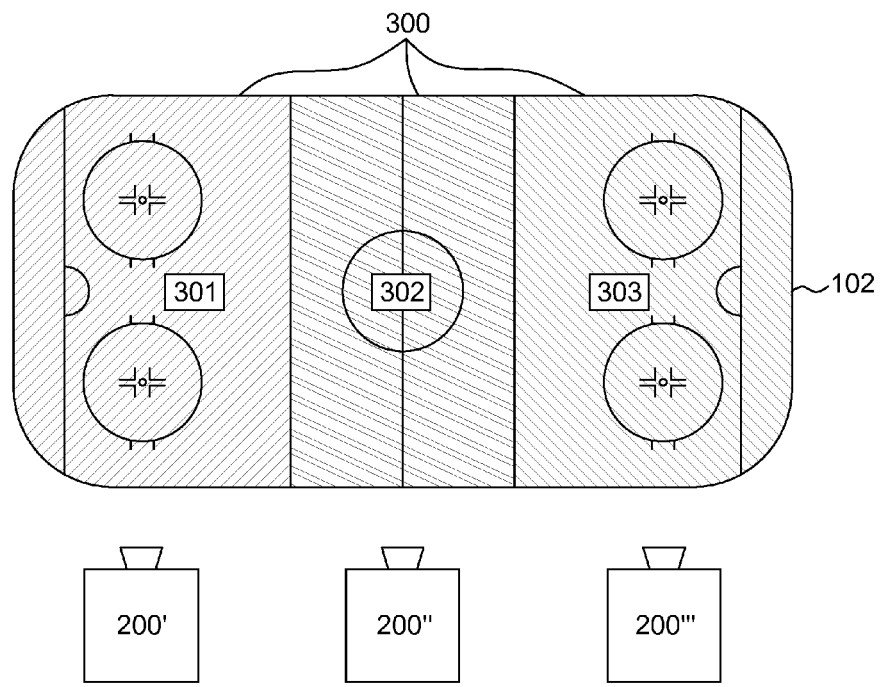
FIGS. 3A and 3B are schematics illustrating the mapping of zones of interest onto a playing field.
Figure 3B:
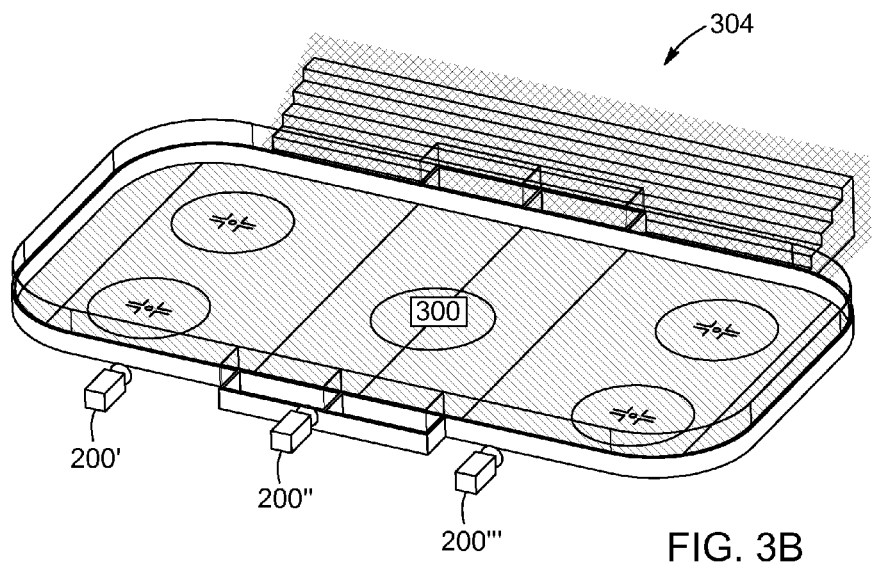

With reference to FIGS. 3A and 3B, the tracking cameras 200 can be arranged and calibrated so as to cover a specific tracking region 300 in the venue. In the present embodiment, the tracking cameras 200 are arranged and calibrated so as to map a tracking region 300 onto the playing field 102. In so doing, objects are only tracked if they are located within the tracking region 300. Objects outside of the tracking region 300, for example spectators in the stands or players on the bench 304, can be ignored or filtered out.

The tracking cameras 200 can be further configured so that they are each assigned to capture tracking video of a particular zone of interest. In the present embodiment, the playing field 102 is divided into three zones of interest, 301, 302 and 303. Each of these zones of interest corresponds to a zone of the playing field. In the present embodiment, the first zone of interest 301 corresponds to the defensive zone of the hockey rink; the second zone of interest 302 corresponds to the neutral zone; and the third zone of interest 303 corresponds to the offensive zone. Of course, other zone divisions are also possible. For example, other zones of interest could correspond to the faceoff circles. Each of the tracking cameras 200', 200" and 200''' are positioned to capture tracking video primarily in its assigned zone of interest. If the FOV of the cameras overlap, each camera can be individually calibrated so as to ignore motion within its field of view if that motion occurs outside the camera's assigned zone of interest.

The scope of the invention permits that in other embodiments, the number of cameras and their positions can vary. For example, on a given playing field, as few as 1, or as many as "n" tracking cameras can be used. For n cameras, each camera can cover approximately 1/n of the field, with possible overlap between each camera's FOV. Additionally, the spacing between each tracking camera does not necessarily need to be equidistant. Some cameras can be closer together, while others are spaced further apart. For example, several cameras could be clustered in order to track heavily trafficked areas of the field, while fewer cameras could be spread farther apart to track less trafficked areas. Of course, when the spacing between cameras is not equidistant, the FOV overlap between each camera could well vary.

Figure 2:
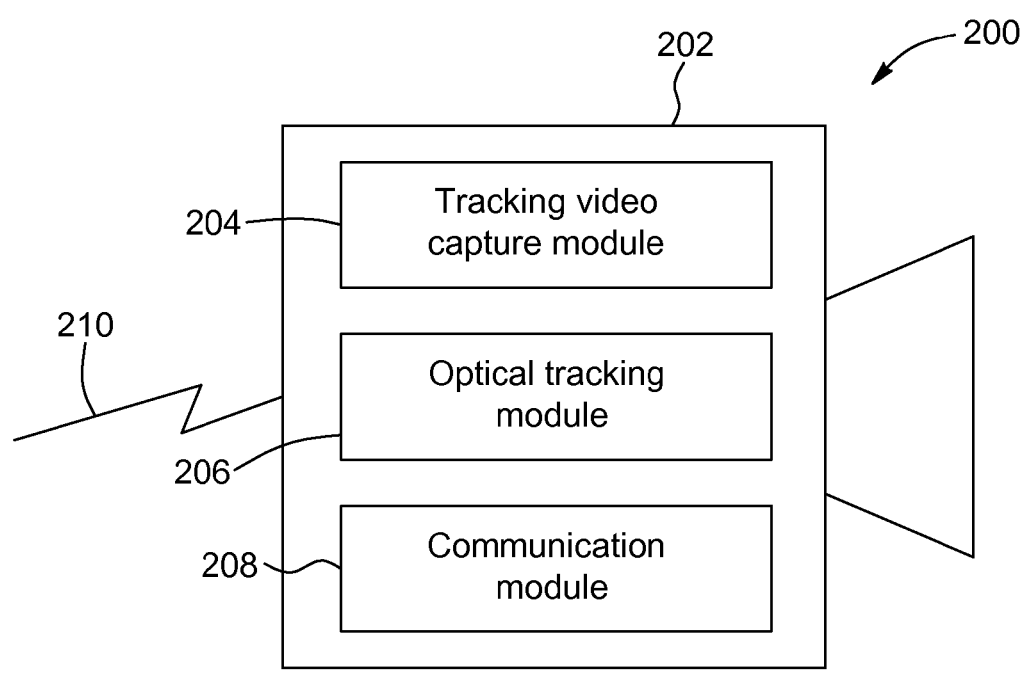
FIG. 2 is a schematic of a tracking camera used in the system of FIG. 1.

The function of the tracking cameras 200 is to provide the system with information about player movements on the playing field 102. With reference to FIG. 2, each tracking camera unit 200 consists of a video camera 202 which includes a tracking video capture module 204, an optical tracking module 206, and a communications module 208. The video camera 202 can be configured, for example, to capture video in the visible spectrum, in the infrared spectrum, or both. The tracking video capture module 204 is responsible for capturing tracking video using a sensor provided in the tracking camera 200. The optical tracking module 206 receives a video signal from the capture module 204, and executes machine vision algorithms in order to track blobs in the video signal. In the present embodiment, the output of the optical tracking module 206 consists of a 3-tuple of x and y position and size of blobs identified in the video. These can be referred to as the location or coordinates of the blobs. In other embodiments, however, the coordinates can include other parameters, such as a z position or orientation for example. The output of the tracking module 206 is transmitted via the communication module 208 over a wired or wireless connection 210 to a processing system for further processing. It should be noted that in the present embodiment, only the 3-tuple of coordinates is transmitted over the connection 210, and not the tracking video itself, reducing the amount of bandwidth required.

In the present embodiment, the single tracking camera unit 200 includes the capture module 204, tracking module 206 and communication module 208. In other words, the processing of the raw tracking video feed and the optical tracking of blobs occurs locally on the camera 200. These modules can be an integral part of a video camera 202, or could be part of a single-board computer attached to a video camera 202, for example.

Referring back to FIG. 1, the system 100 also includes two additional cameras for capturing video of the sporting event. The first is a broadcast camera 106 which is a video camera positioned near the center of the field, preferably on the same side as the tracking cameras. The broadcast camera 106 is movable and can be remotely controlled via an application programming interface (API) to adjust its pan, tilt and zoom (PTZ). According to possible embodiments, the PTZ can be adjusted by physically moving the camera or lens via actuators, or digitally by applying a video effect. The broadcast camera 106 serves to capture a video feed of the action in the sporting event. The second additional camera is a scoreboard camera 108. The scoreboard camera 108 is a video camera pointed at the scoreboard 109 in the venue 101. It serves to capture a video feed of the scoreboard 109 which can later be composited onto the video feed from the broadcast camera.

The tracking cameras 200, broadcast camera 106 and scoreboard camera 108 are each in communication with a processing system 110. In the present embodiment, the processing system is a computing unit 110, such as a server for example. Communication with the computing unit 110 can be accomplished via a local network, and can be either a wired or wireless connection. The computing unit 110 includes at least a processor and memory. The computing unit is configured to receive tracking data from each of the tracking cameras 200 in the form of the x, y and size data. The computing unit 100 then executes a software-implemented method on the tracking data to determine game play, and then control the PTZ of the broadcast camera 106 to get the best view of the game action. The computing unit 110 can also receive the video feeds from both the broadcast camera 106 and the scoreboard camera 108, and can create a composite therefrom to show both the game action and current score. The resulting composite image can be further manipulated to add other effects or graphics before being distributed or broadcasted over a network 111, such as the internet for example, to client devices 112 such as computers, smartphones, tablets or other such devices.

In some embodiments, the video can be broadcasted over the internet by means of a content delivery network (CDN). In such an embodiment, the video captured by the broadcast camera 106 and the scoreboard camera 108 is streamed to the CDN. The video could be streamed either directly from the cameras, or could be streamed through the computing unit 110. The CDN is then responsible for transcoding the video for compatibility with various platforms, and distributing the video to the client devices 112. The video is delivered to native applications running on the client devices 112, and can also be made available via a web application. In some embodiments, the video can be distributed to the client devices 112 in the form of a live video feed of the sporting event.

The system 100 can further include other devices or sensors to further enhance the broadcasted video. For example, the system can be equipped with a microphone or an array of microphones for capturing audio of the sporting event and of the audience. The microphones can be directional or non-directional and can be strategically placed throughout the venue. In some embodiments, the broadcast camera 106 could be provided with a directional microphone such that audio in the field of view of the broadcast camera 106 is captured. The system can also include a microphone capable of pan, tilt and zoom which can be controlled by the processing system 110 in a similar manner as the broadcast camera 106 in order to follow the game action.

An advantage of the present invention is that it permits other embodiments to scale according to varying needs. For example, in other embodiments, the system can comprise multiple broadcast cameras positioned at other vantage points around or above the playing field. Additionally, more tracking cameras can be used for larger fields, and fewer can be used for smaller fields. In some embodiments, the computing unit can be located on-site. In other embodiments the computing-unit can be off-site and can be cloud-based to further reduce the amount of hardware involved. According to possible embodiments, each of the cameras can be HD, or in higher resolutions such as 2K or 4K. Finally, the tracking cameras and the broadcast cameras can be integrated into a single unit to further reduce costs and the amount of equipment involved.

Method

According to an aspect of the invention, a method for automatically capturing broadcastable video of a sporting event within a venue is provided. The method includes steps for tracking players, recording game action, and broadcasting a video feed to an audience. The method is preferably carried out on a system such as the one described above.

Figure 4:
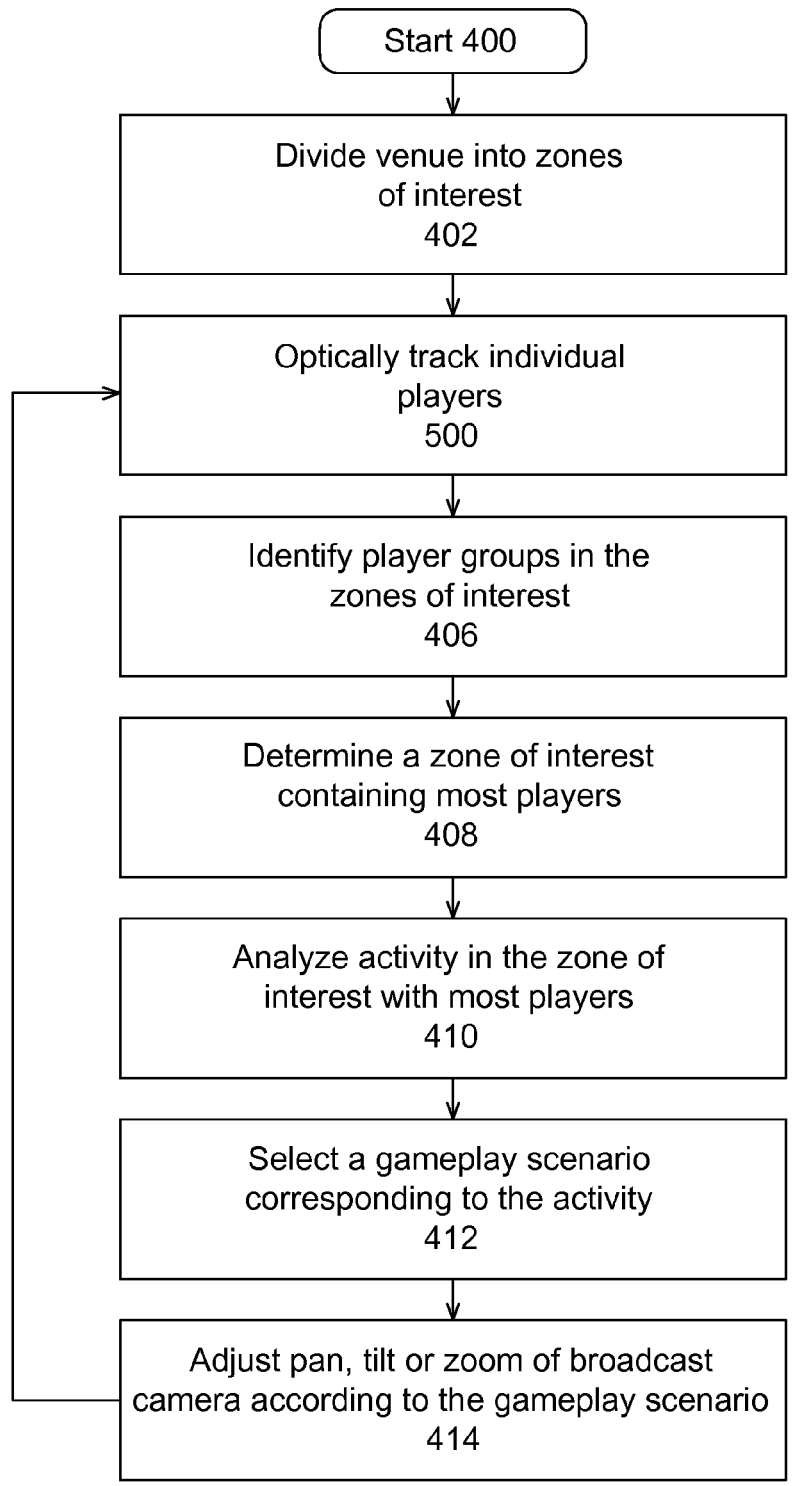
FIG. 4 is a flowchart illustrating a method for automatically capturing broadcastable video of a sporting event within a venue, according to an embodiment.

Broadly described, and with reference to FIG. 4, the method includes the steps of: dividing the venue into zones of interest 402; optically tracking individual players 500; identifying player groups in the zones of interest 406; determining a zone of interest containing most players 408; analyzing activity in the zone of interest with most players 410; selecting a gameplay scenario corresponding to the activity 412; and adjusting the pan, tilt and zoom of a broadcast camera according to the gameplay scenario 414. The steps between 500 and 414 are repeated continuously, such that players are continuously tracked and the PTZ of the broadcast camera is updated in real-time.

Figure 5:
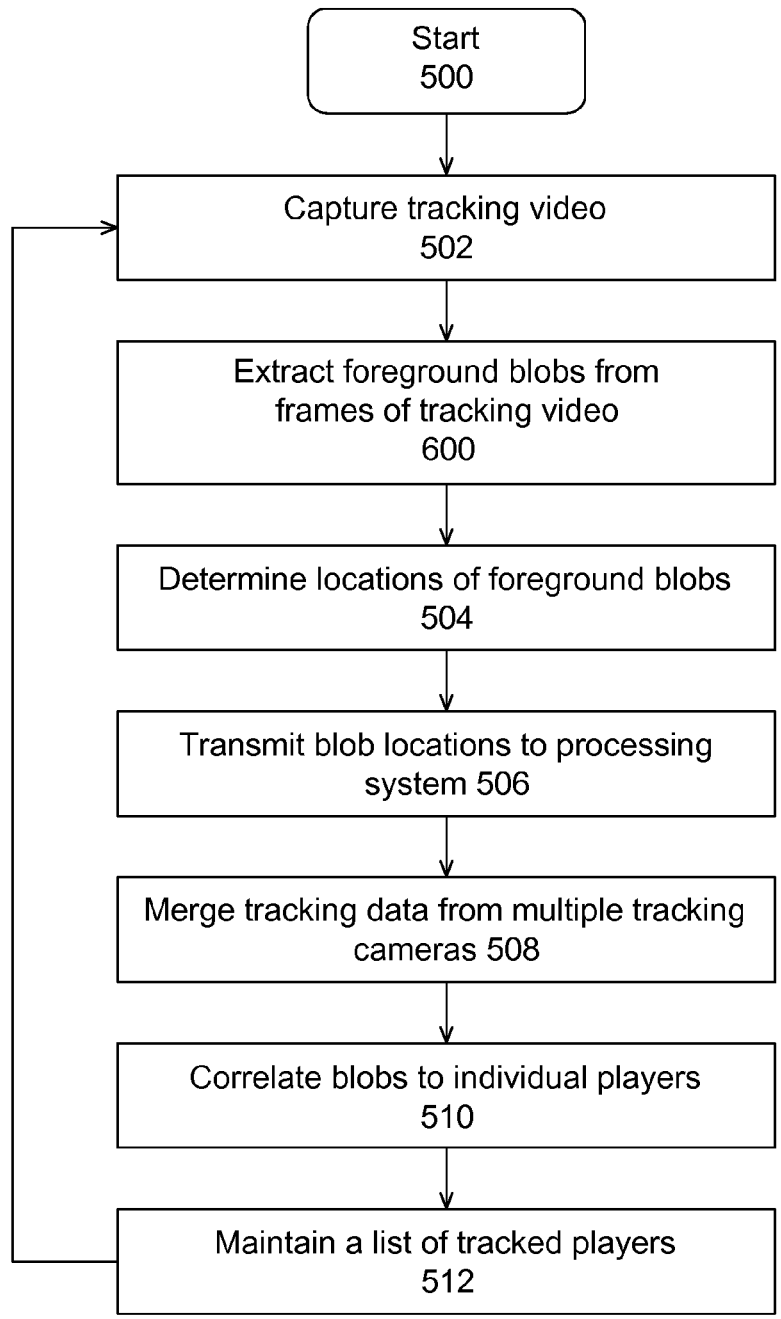
FIG. 5 is a flowchart illustrating a method for optically tracking individual players, useful in the method of FIG. 4.

With reference to FIG. 5, the step of optically tracking individual players 500 can include the steps of: capturing tracking video 502; extracting foreground blobs from frames of the tracking video 600; determining locations of foreground blobs 504; transmitting blob locations to a processing system 506; merging tracking data from multiple tracking cameras 508; correlating blobs to individual players 510; and maintaining a list of tracked players 512. The steps can be repeated continuously.

Many of these steps can be carried out on a central processing system, while some steps can be offloaded to other dedicated modules, such as a dedicated module on the tracking cameras. In an embodiment, the method can first involve analyzing video data on a tracking camera unit to determine x, y and size information of blobs corresponding to players or groups of players. Next, a processing system receives blob information from multiple camera units and runs a software-implemented process in order to analyze the game action. Finally, the processing system controls a broadcast camera to provide the best view of the game action.

Figure 6:
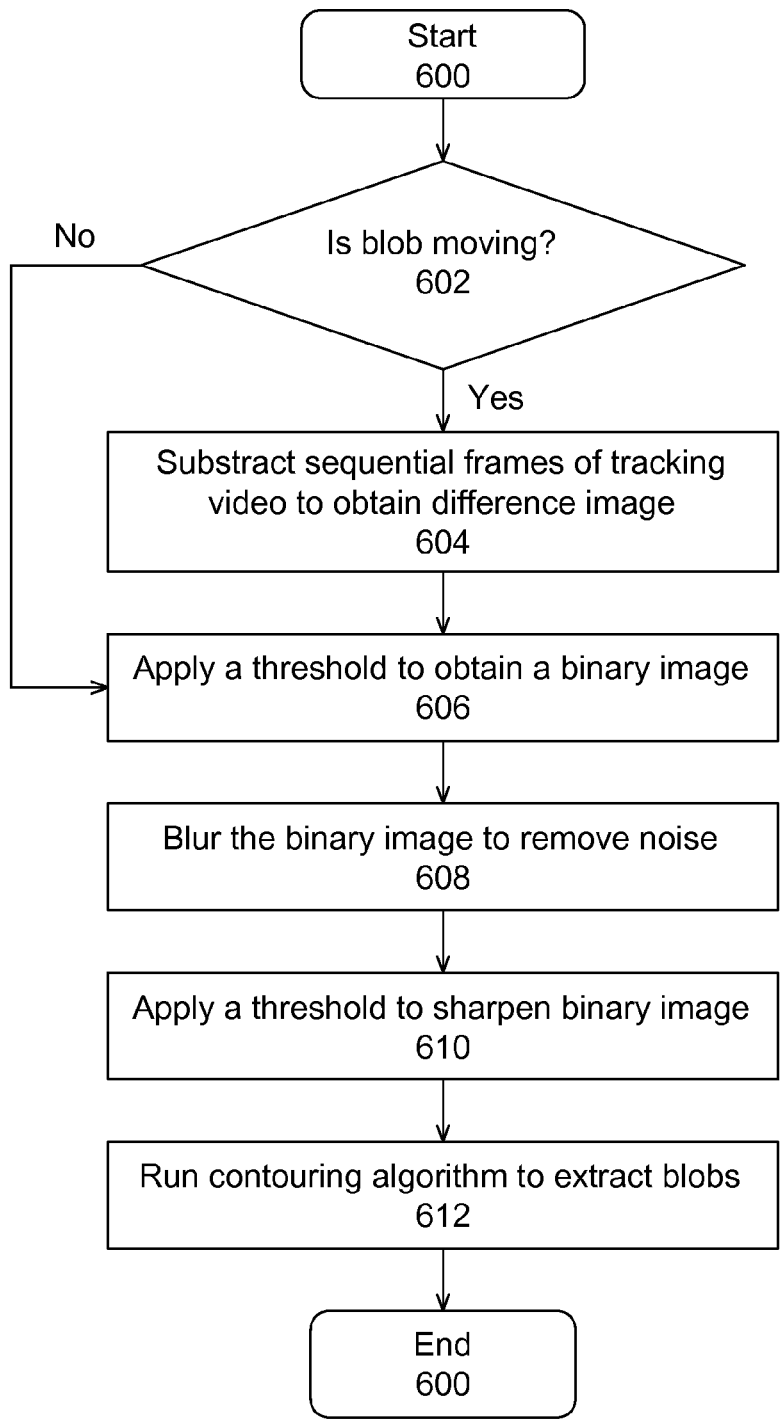
FIG. 6 is a flowchart illustrating a method for extracting foreground blobs from frames of tracking video, useful in the method of FIG. 5.

In the presently described embodiment, a first portion of the method can be executed on each tracking camera unit. With reference to FIGS. 5 and 6, the optical tracking module of the tracking camera unit can perform the following steps:

a) Read a video frame image; wait for a period of time before reading another video frame image, 502.
b) Subtract the two sequential images to get an absolute difference image, 604.
c) Apply a threshold to convert the difference image to a binary image, 606.
d) Apply a blur filter on the binary image to remove noise, 608.
e) Apply another threshold to sharpen the binary image, 610.
f) Execute a contouring process to extract the foreground blobs from the background, 612.
g) Discriminate blobs based on their size to remove unwanted noise and blobs that are smaller than "n" pixels in size.
h) Convert the blob's absolute pixel x, y position based on image width and height into normalized 0.0-1.0 values, 504.
i) Stream the 3-tuple of x, y position, and size of each blob to the processing system for use in the software-implemented process for determining game play, 506.
j) Repeat from step a).

In an embodiment, the method can involve using a different image processing technique for extracting static blobs than for extracting moving blobs. This can allow the system to better handle players who are not moving. With reference to FIG. 6, the method can include a step 602 of determining if a blob is moving. If the blob is moving, steps a) through j) are carried out normally as described above. If the blob is not moving, its location is determined from analyzing a single frame of tracking video. As such, the analysis is not performed on a difference image, and the step of subtracting sequential frames is skipped.

In the present embodiment, a second portion of the method can be performed on the processing system. The function of the processing system is to receive player position information from the tracking cameras, execute a process for determining the game play, and control the PTZ of the broadcast camera. Game play can be determined by analyzing the activity of players within a zone of interest and selecting a gameplay scenario from a predetermined set of gameplay scenarios. The set of scenarios can include, for example, a faceoff, a breakaway, or player movement. A scenario can be selected based on a pattern of players or a sequence of events of players or groups of players in the zones of interest. Once a scenario is selected, the PTZ of the broadcast camera is adjusted to provide the best view of the game action according to the scenario.

In an embodiment, the following steps can be executed by a processing system in a continual loop. In the presently described embodiment, the system includes four tracking cameras for tracking players in four zones of interest: the defensive zone (zone 1), half of the neutral zone closest to the defensive zone (zone 2), half of the neutral zone closest to the offensive zone (zone 3) and the offensive zone (zone 4).

The processing system asynchronously receives data from each of the tracking camera units. The data is in the form of a list of 3-tuple x, y position, and size of each of the blobs detected in the tracking camera units.

Each blob's x and y position is normalized based on the camera's FOV pixel width and height:
  Blob position x=0 means tracking camera horizontal FOV left most pixel.
  Blob position x=1.0 means tracking camera horizontal FOV right most pixel.
  Blob position y=0 means tracking camera vertical FOV top most pixel.
  Blob position y=1.0 means tracking camera vertical FOV bottom most pixel.

In the present embodiment, the y position is the same for all 4 tracking cameras and is not modified. However, in other embodiments, the y position may need to be normalized. The x position needs to be normalized across all 4 tracking cameras where:
  Camera 1, the x position ranges from 0-0.25.
  Camera 2, the x position ranges from 0.25-0.50.
  Camera 3, the x position ranges from 0.50-0.75.
  Camera 4, the x position ranges from 0.75-1.0

The normalized blob data is placed into a working blob list.

The processing system then executes the player tracking process which matches past data with present data (working blob list, or list of tracked players) to determine which blobs are the same but offset in space and time. The process filters the blobs based on size >"n" pixels and places these into a list. The value of "n" can be chosen based on the relative size of player blobs and calibrated based on the position and resolution of the tracking cameras. For example, the value of "n" could range between 10 and 25 pixels. In an exemplary embodiment, "n" can be 10.7 pixels, thereby considering all blobs smaller than 10.7 square pixels in size to be noise. The blob tracking process uses a minimum distance calculation to find the best match between past blobs and blobs in the list. If the distance calculation is less than a minimum limit then there is a match and the blob is assigned a player object and added to list of player's blobs. The blob added to the list thereby corresponds to a most recent last known location of a tracked player. Blobs that do not have a match to past data are then considered as new and assigned to a player object. The player's blob list is kept to a maximum length of the "n" last blobs. In other words, in the list of tracked players, each tracked player is associated with a predetermined number "n" of their last known locations. The value of "n" in this context can be chosen based on the least amount of previous information necessary to ascertain a player's direction of movement. The value of "n" could range, for example, between 5 and 10 last blobs. In an exemplary embodiment, "n" is chosen as 5, so each player's blob list contains only 5 blobs corresponding to the player's last known locations.

The player's blob list is used to calculate the speed and direction of the player. Calculating the player's x or horizontal direction is based on looping though the player's blob list and summing the difference between the new x position and the previous x position.

$$x\text{Dir} = \Sigma_{i=0}^{n-1} i = (x\text{Dir}[i+1] - x\text{Dir}[i])$$

Likewise, calculating the player's y or vertical direction is based on looping though the player's blob list and summing the difference between the new y position and the previous y position.

$$y\text{Dir} = \Sigma_{i=0}^{n-1} i = (y\text{Dir}[i+1] - y\text{Dir}[i])$$

A positive xDir value implies that the player is moving within the tracking camera image from left to right. A negative value of xDir means that the player is moving within the tracking camera image from right to left. A zero value implies that the player is not moving in the horizontal direction. The magnitude of xDir is the speed in the horizontal direction.

A positive yDir value implies that the player is moving within the tracking camera image from top to bottom. A negative value of yDir means that the player is moving within the tracking camera image from bottom to top. A zero value implies that the player is not moving in the vertical direction. The magnitude of yDir is the speed in the vertical direction.

Simplified clustering can be applied to reduce processing complexity. In an embodiment, each tracking camera can be considered a potential cluster or player group. A tracking camera can consist of a cluster of 0 or 1 player groups. Hence there can be at a minimum 0 player groups and at a maximum of 4 player groups across all tracking cameras. In other embodiments, the players can be broken down into several player groups. Performing a cluster analysis on one zone of interest or on the entire playing field can allow the identification of player groups within the zones of interest, or a global group of players within the entire venue. Groupings can be further broken down into sub groups.

If a tracking camera has detected players, the group's speed and direction is calculated from individual player's speed and direction. Averaging the sum of all players moving left, averaging the sum of all players moving right and taking the maximum value of the two averages is the speed and direction of the group. Speed and direction is calculated for all tracking cameras.

The leftmost player, rightmost player, topmost player and bottommost player are determined based on the x and y position values of all players. The left and right player x positions, and the top and bottom player y positions, are used to calculate the potential FOV of the camera. A narrow FOV implies that the left and right players have x positions relatively close or that the top and bottom players have y positions relatively close. A wide FOV implies that the x or y positions are far apart.

The potential FOV can be used in some gameplay scenarios to give an overview of all players on the playing field, or to give an overview of all players within a particular zone of interest. As the players move about, the potential FOV changes such that it is bounded to contain all players. As such, the FOV calculated in this way provides a good view for regular gameplay as players move from one end of the ice to another.

Figure 9A:
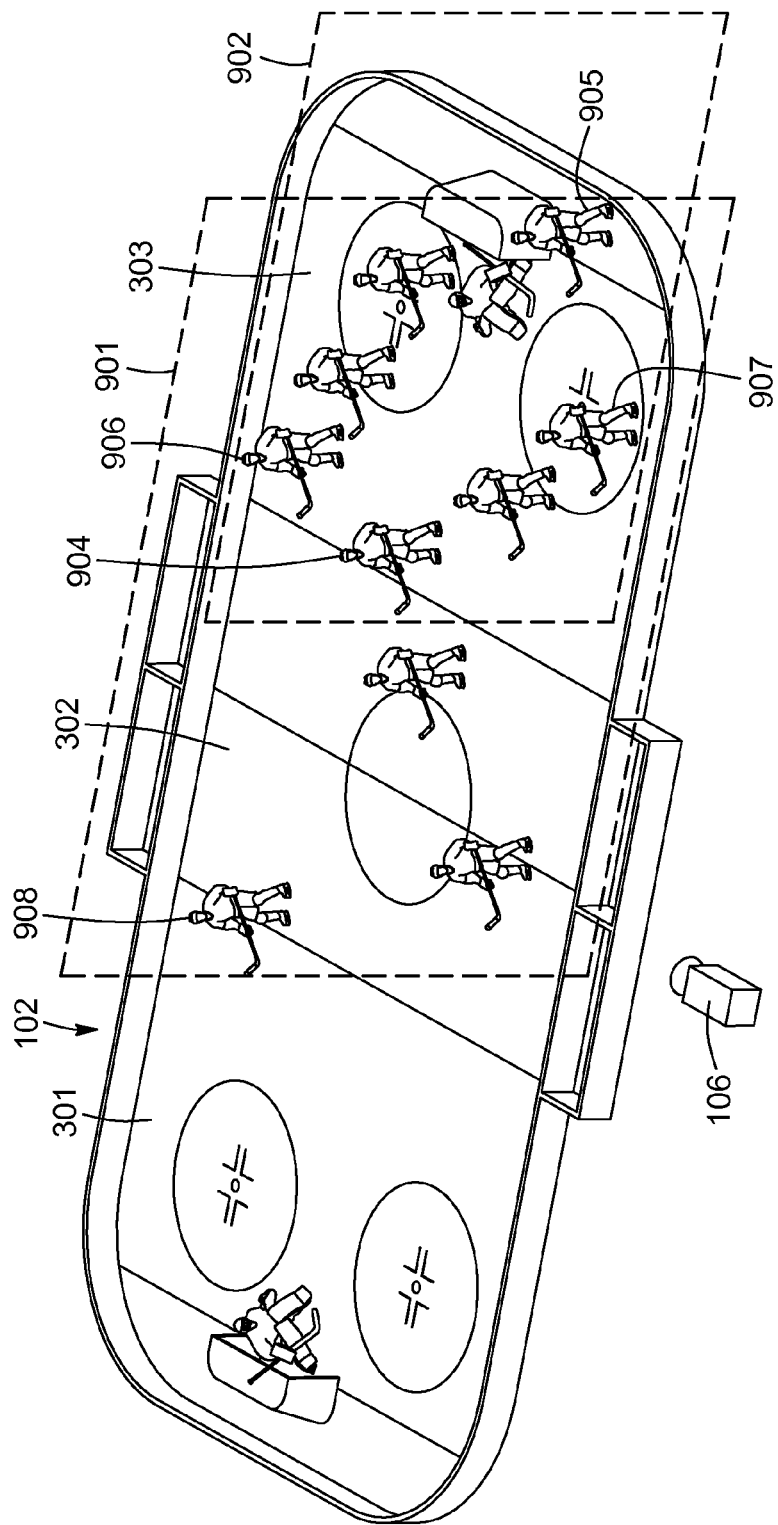
FIG. 9A, 9B and 9C are schematics illustrating adjusting the pan, tilt, and zoom values of the broadcast camera to change its field of view.
Figure 9B:
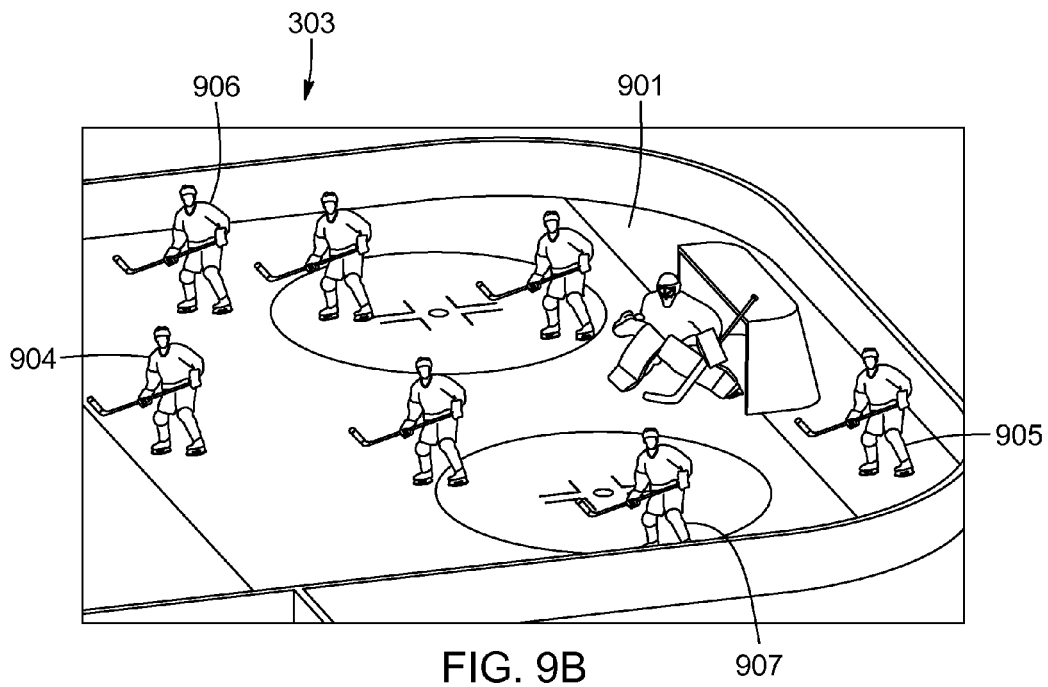
Figure 9C:
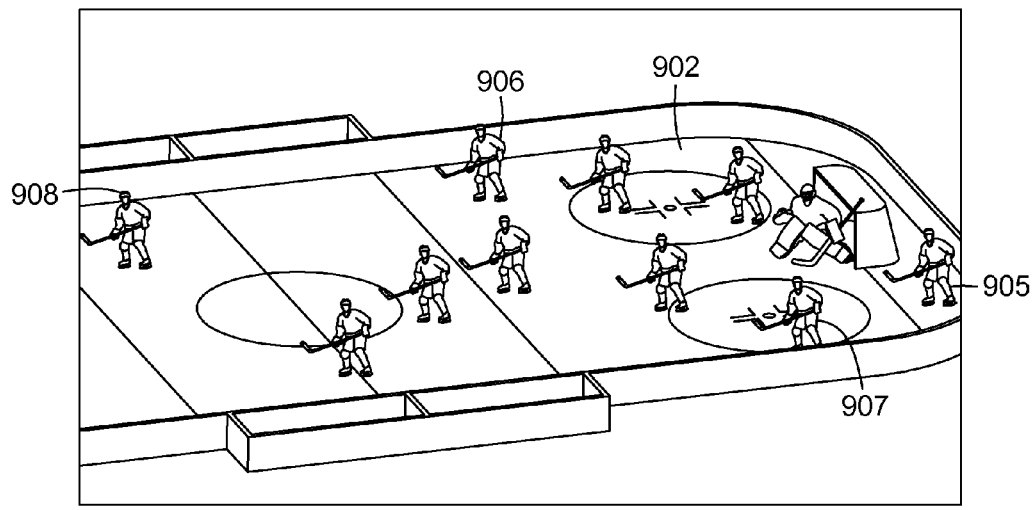

The potential FOV can be calculated such that it is bounded to contain all players within a zone, or to contain all moving players on the playing field. With reference to FIGS. 9A and 9B, a first FOV 902 can be calculated such that it is bounded to contain all players within the offensive zone 303. In this configuration, player 904 is the leftmost; player 905 is the rightmost; player 906 is the topmost; and player 907 in the bottommost. Such a FOV can be useful, for example to portray an attacking scenario or a power play. With reference to FIGS. 9A and 9C, a second FOV 901 can be calculated such that it bounds all moving players on the playing field 102. In this configuration, player 908 is instead the leftmost player, and the FOV includes a view of the offensive zone 303 and the neutral zone 302. Such a FOV can be useful for example, for a breakout play scenario.

The tracking camera that has the most players is assigned as the tracking camera zone which is used in the software-implemented process for determining the game play and selecting the current gameplay scenario. Data in the remaining zones can be ignored for the purpose of determining game play, so as to reduce to processing complexity, for example.

To determine if players are transitioning from one zone of interest (also referred to as a tracking camera zone) to another, a variable is used to store the previous zone of interest. If the previous zone id is less than the current zone id then the players are moving right. If the previous zone id is greater than the current zone id then the players are moving left. If the previous zone id is the same as the current zone id then the players are moving within the same tracking camera zone. This approach is sufficient to detect transitions for slow moving players but may not be sufficient for fast moving players. Detecting fast moving players or player groups can require a predictive process.

To facilitate in detecting players transitioning from one zone to another, left and right x position trigger markers are used. If the group of players is moving (x direction is not 0) within a zone, and if the group's x position falls with the marker and the associated zone edge, and if the speed of the group is greater than a limit, then the prediction is that the group is transitioning into the new camera zone.

The current tracking camera zone and the predicted transitioning tracking camera zone can be used in the process for determining the game play.

In some embodiments, the tracking cameras are not capable of detecting players that are not moving and therefore do not send blob data to the processing system for non-moving players. The processing system must detect when a player is not moving by tracking players' speed and direction. As a player's current speed approaches a value of "x" limit from 0, the player is considered as stopped and the player's current position, speed and direction are stored in a player stopped list. During player tracking, if a new player is detected their position is compared with players in the stopped list. If there is a match then the new player is a previously stopped player. Player values in the stopped list have a lifespan so that after time "t" the player values are deleted if they are not matched to a moving player.

The stopped players can be used in faceoff handling where you have several stopped players and a single official or player moving to a new position. In a pure priority movement-based process, a moving official or player would cause the process to generate pan, tilt, and zoom values so that the broadcast camera follows the movement. With the present method, the process recognizes that the players are stopped in a faceoff circle, and selects a faceoff gameplay scenario. In the faceoff gameplay scenario, the broadcast camera is panned, titled and zoomed to focus in on the faceoff area where a player a group of players is located. Even if there is single player movement, the process will maintain the current broadcast camera pan, tilt values instead of following the movement of the single player. Such a state is maintained until the faceoff ends and the process selects a different gameplay scenario.

Figure 7:
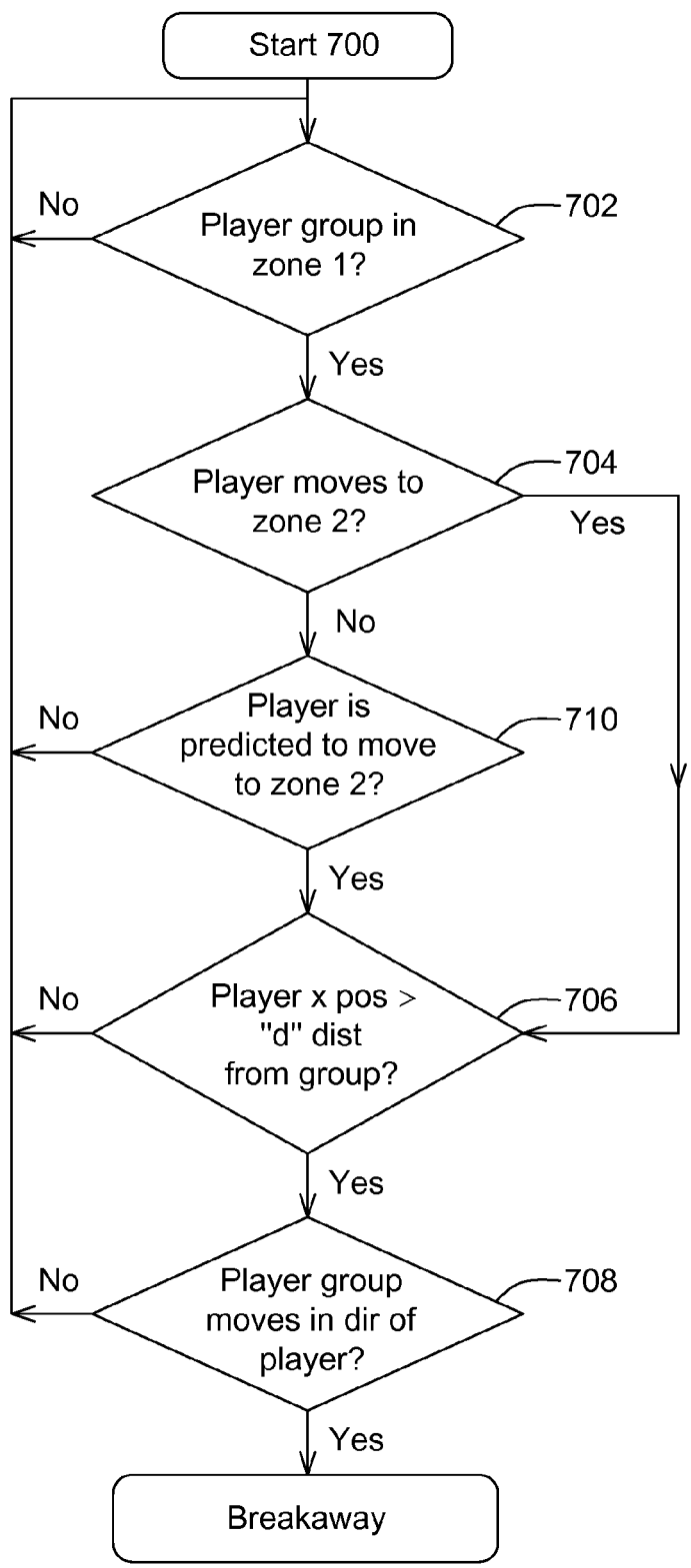
FIG. 7 a flow chart illustrating a method for identifying a gameplay scenario corresponding to a breakaway, useful in the method of FIG. 4.

A breakaway gameplay scenario can be identified by analyzing activity such as a combination of both player group dynamics (speed and position) and single player behavior. Referring to FIG. 7, the following sequence of events 700 must occur to predict a breakaway:

All players (the group) are in one of either tracking camera zones 1 or 4 (end zone) for a certain period of time "t", 702.

One player (breakaway player) transitions into another zone (2 or 3) at a speed faster than the player group 704 and at a distance greater than "d" from the group 706.

The player group must move within the "end zone" in the same direction as the breakaway player or transition to another zone, 708.

In examining the player and group activity, the system can analyze player and group dynamics in a single zone of interest which contains the most number of players. In scenarios where play is shifting rapidly, the sequence can include the step 710 of predicting if a player or group is moving to zone 2 or 3. If so, the system can analyze activity within both the predicted zone and the zone currently containing the most players.

The gameplay scenario can change often during a game. Selecting the gameplay scenario can therefore involve a continuous analysis of the gameplay activity in order to select the appropriate scenario. The selection may involve a decision-making tree which identifies patterns or a sequence of events indicative of a particular scenario. Once a scenario is selected, the PTZ of the broadcast camera can be adjusted to best represent the current gameplay within the frame of the broadcastable video.

Figure 8:
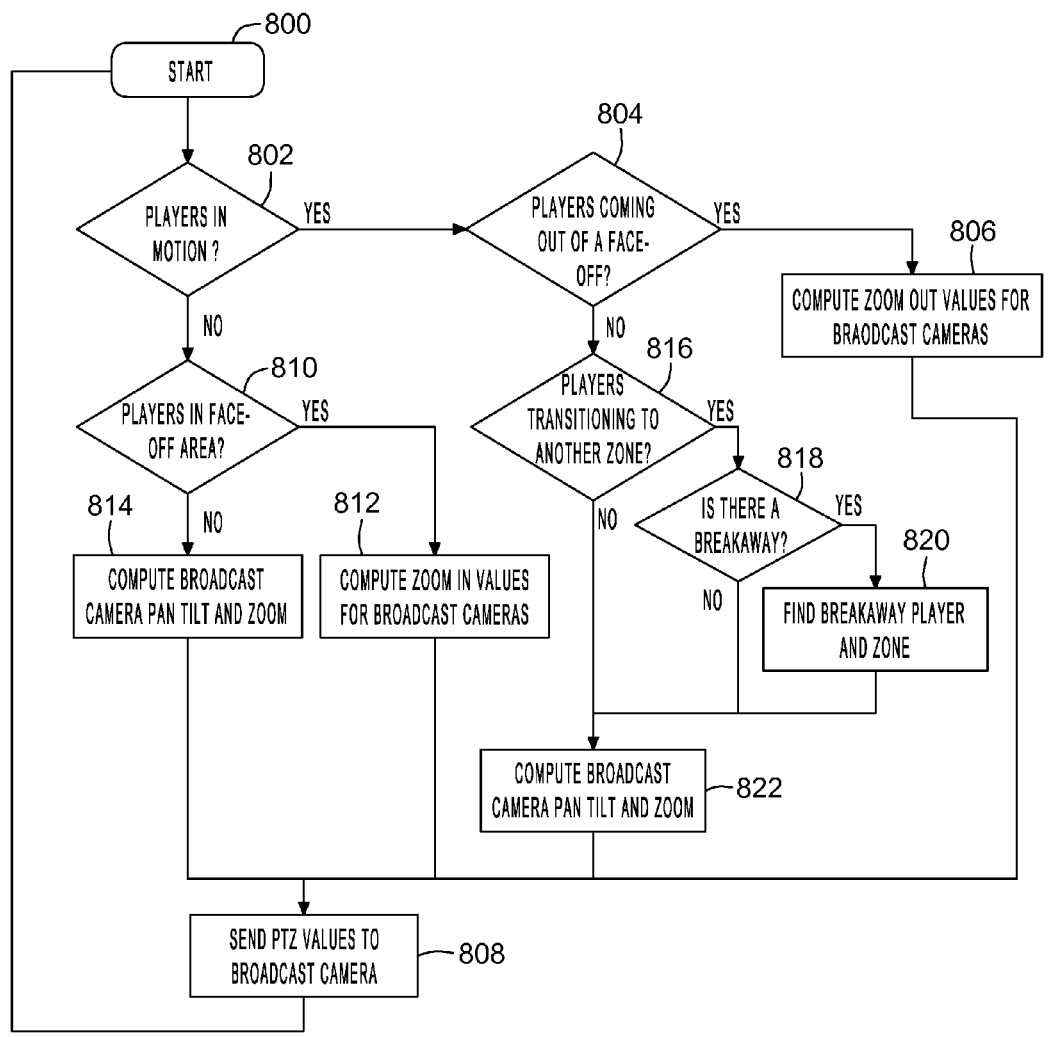
FIG. 8 is a flow chart illustrating a method for selecting a gameplay scenario from a set of predetermined gameplay scenarios and for adjusting the pan, tilt, and zoom values for the broadcast camera, useful in the method of FIG. 4.

With reference to FIG. 8, a method for selecting a current gameplay scenario uses the parameters described above to identify a particular gameplay scenario and adjust the PTZ values of the broadcast camera accordingly. If the players are in motion 802, and the players are coming out of a face-off area 804, the selected scenario is a completed faceoff. The camera zooms out of the faceoff area 806 to show more of the ice. If the players are in motion 802, but are not coming out of a faceoff 804, the selected scenario is standard play. The camera is panned, tilted and zoomed 822 to follow the movement of the players. If the sequence of events described in FIG. 7 occurs, the selected scenario is a breakaway 818. The breakaway player and zone are found 820 and the camera is panned, tilted and zoomed 822 to focus on the breakaway player.

If the players are not in motion 802 at the beginning of the process, but the players are in the faceoff area 810, the selected scenario is a faceoff. The broadcast camera is panned, tilted and zoomed to focus on the faceoff circle. If the players are not in the faceoff circle 810, the camera is tilted and zoomed to follow the action accordingly 814.

Still referring to FIG. 8, once the PTZ values have been calculated the values are sent from the computer to the broadcast camera via an API 808.

Figure 10:
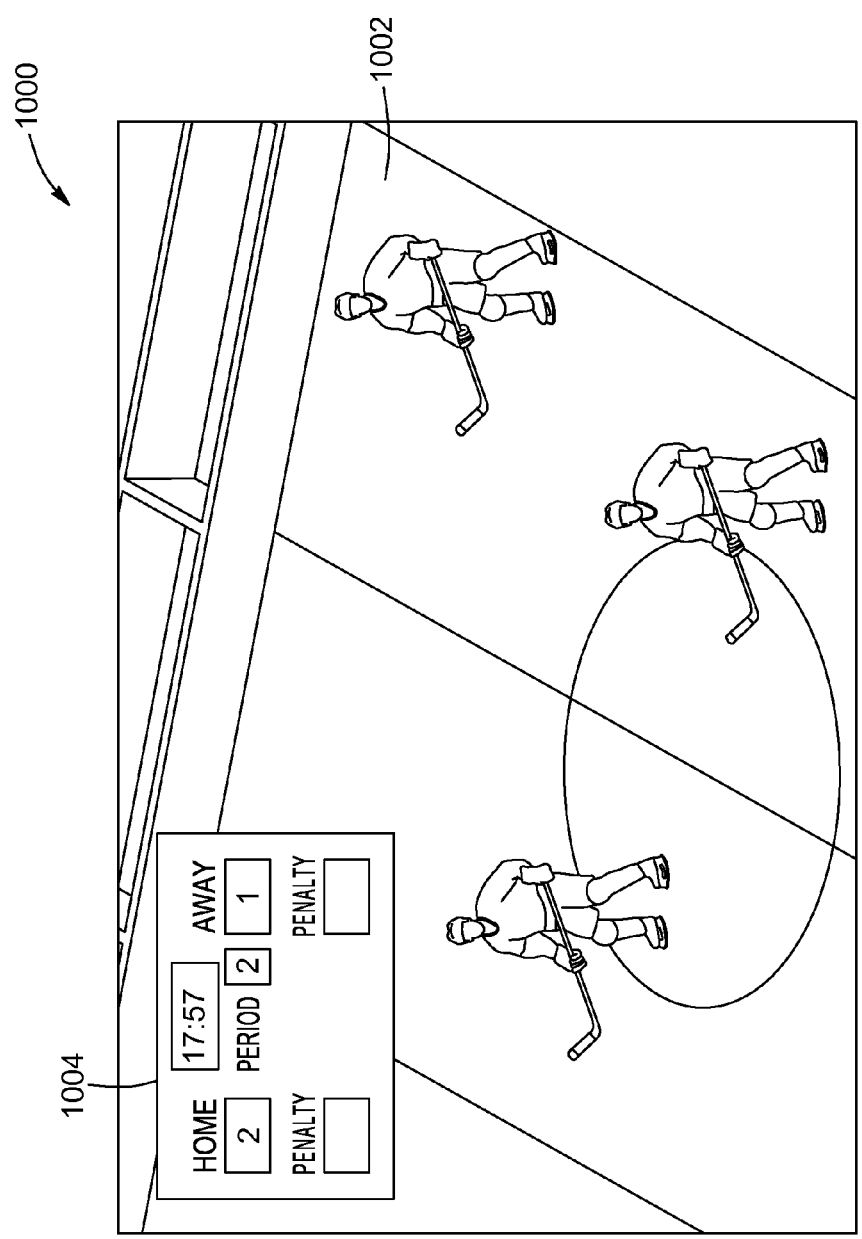
FIG. 10 is a schematic illustrating scoreboard video composited onto broadcastable video of the sporting event.

The method can further involve the additional step of compositing the scoreboard video on top of the video recorded by the broadcast camera. With reference to FIG. 10, a composited video 1000 can include a video feed of the scoreboard 1004 overlaid onto a portion of the video captured by the broadcast camera 1002. In this fashion a spectator watching the video will be able to see the score of the game at all times. In the illustrated embodiment, the feed from the scoreboard camera is composited directly onto the feed from the broadcast camera. Preferably the scoreboard video is positioned such that it does not visually interfere with the video from the broadcast camera. The scoreboard feed can be faded or temporarily hidden if it is determined that the scoreboard video would interfere with broadcast camera video, for example if it would be covering a player. In an embodiment, the scoreboard video could be processed in order to extract the information which it displays. This information can be used to automatically generate a custom graphic representative of the scoreboard to overlay onto the video from the broadcast camera. Once composited, the resulting video can be broadcast to client devices over the internet or another network. It can be broadcast in the form of a live feed of the game, or saved for broadcast at a later date.

The listed steps are but some possible embodiments of the presently described invention. Other embodiments permit that some of the steps be performed in a different order, that they be performed on different components, or that several steps be performed on a single component. For example, the blob data can be generated on the same computing unit which determines the game play, instead of being generated on a separate computing module in the tracking camera unit.

According to other possible embodiments, when using the method for tracking sports other than hockey, additional steps can be involved to identify and select different gameplay scenarios specific to the particular sport. Also, according to other embodiments, the thresholds and pixel sizes used in the various processes could well vary and may need to be calibrated according to the needs of the system. The specific values described in the embodiment presented hereinabove are for exemplary purposes only and should not be taken to limit the scope of the invention in any way.

What is claimed is:

1. A method for automatically capturing broadcastable video of a sporting event within a venue, the method comprising the steps of:

dividing the venue into a plurality of zones of interest;

optically tracking individual players in the venue by determining respective positions of the individual players within the zones of interest using at least one fixed tracking camera;

based on the respective positions of the individual players, performing a cluster analysis to identify player groups within the zones of interest;

determining a given one of the zones of interest containing the most number of individual players;

analyzing activity of the individual players and player groups within the given one of the zones of interest to select a current gameplay scenario corresponding to said activity, said current gameplay scenario being selected from a predetermined set of gameplay scenarios;

based on the current gameplay scenario, adjusting a pan, tilt or zoom of a broadcast camera in real-time, thereby changing a field of view of the broadcast camera and capturing the broadcastable video of the sporting event further comprising identifying individual players or player groups transitioning between adjacent zones of interest, and wherein the current gameplay scenario is selected based on a current position, speed, or direction of the individual players or player groups transitioning between the adjacent zones; further comprising predicting a transition of the individual players or player groups between first and second adjacent zones, and wherein the activity of the individual players and player groups is analyzed within both the first adjacent zone and the second adjacent zone in order to select the current gameplay scenario.

2. The method according to claim 1, wherein the current gameplay scenario is selected based on a current position, speed or direction of at least one of the individual players or at least one of the player groups in relation to the given one of the zones of interest.

3. The method according to claim 1, wherein optically tracking the individual players comprises:
   extracting foreground blobs from frames of tracking video captured by the at least one fixed tracking camera;
   determining locations of the foreground blobs based on their positions within the frames of the tracking video;
   correlating each of the foreground blobs to a respective one of the individual players; and
   maintaining a list of tracked players, each tracked player in the list being associated with a predetermined number of last known locations of the player.

4. The method according to claim 3, wherein correlating the foreground blobs comprises matching the location of a foreground blob to a player in the list having a last known location closest to the foreground blob, and if a match is found, updating the list so that a most recent last known location associated with the player corresponds to the location of the foreground blob, and if a match is not found, adding a new tracked player to the list with a most recent last known location corresponding to the location of the foreground blob.

5. The method according to claim 3, wherein extracting foreground blobs from frames of tracking video captured by the at least one fixed tracking camera comprises subtracting sequential frames of the tracking video to obtain a difference image, and extracting the foreground blobs from the difference image by:
   applying a threshold on the difference image to obtain a binary image of the foreground blobs on a background;
   blurring the binary image to remove noise; and
   running a contouring algorithm on the binary image to extract the blobs.

6. The method according to claim 5, further comprising identifying moving blobs corresponding to moving players and stationary blobs corresponding to stationary players, wherein the moving blobs are extracted from the difference image and wherein the stationary blobs are extracted from a single frame of the tracking video.

7. The method according to claim 1, wherein selecting the current gameplay scenario comprises matching the activity of the individual players and player groups with a predetermined pattern associated with a particular gameplay scenario in the predetermined set of gameplay scenarios.

8. The method according to claim 1, wherein the venue is divided such that the zones of interest correspond to zones of a playing field within the venue.

9. The method according to claim 1, further comprising calibrating the at least one fixed tracking camera by mapping a tracking region on a playing field within the venue, the tracking region being a region within which tracking video is used to optically track the individual players, and outside of which the tracking video is ignored.

10. The method according to claim 1, wherein the individual players are tracked using a plurality of fixed tracking cameras, and further comprising normalizing tracking data across the plurality of tracking cameras, and merging tracking data from across the plurality of tracking cameras in order to track the individual players globally within the venue.

11. The method according to claim 1, further comprising performing a cluster analysis on the position of individual players to identify a global group of players within the venue, and selecting the gameplay scenario based on a current position, speed or direction of the global group.

12. The method according to claim 1, further comprising capturing scoreboard video and compositing said scoreboard video on the broadcastable video, the scoreboard video comprising video of a scoreboard within the venue.

13. The method according to claim 1, wherein the pan, tilt or zoom of the broadcast camera is adjusted such that the field of view is bounded to contain a leftmost player, a rightmost player, a topmost player and a bottommost player within the given one of the zones of interest or within the venue.

14. The method according to claim 1, further comprising broadcasting the broadcastable video as a live feed over a network.

15. A system for automatically capturing broadcastable video of a sporting event within a venue, the system comprising:
   at least one fixed tracking camera configured to capture tracking video of players in the venue;
   a broadcast camera configured to capture the broadcastable video of the sporting event, the broadcast camera being remotely controllable to adjust pan, tilt or zoom of the broadcast camera; and
   a processing system operatively coupled to the at least one tracking camera and to the broadcast camera, the processing system configured to:
      divide the venue into a plurality of zones of interest;
      optically track individual players in the venue by determining respective positions of the individual players within the zones of interest using the at least one fixed tracking camera;
      based on the respective positions of the individual players, perform a cluster analysis to identify player groups within the zones of interest;
      determine a given one of the zones of interest containing the most number of individual players;
      analyze activity of the individual players and player groups within the given one of the zones of interest to select a current gameplay scenario corresponding to said activity, said current gameplay scenario being selected from a predetermined set of gameplay scenarios; and
      based on the current gameplay scenario, adjust a pan, tilt or zoom of the broadcast camera in real-time, thereby changing a field of view of the broadcast camera and capturing the broadcastable video of the sporting event further comprising identifying individual players or player groups transitioning between adjacent zones of interest, and wherein the current gameplay scenario is selected based on a current position, speed, or direction of the individual players or player groups transitioning between the adjacent zones; further comprising predicting a transition of the individual players or player groups between first and second adjacent zones, and wherein the activity of the individual players and player groups is analyzed within both the first adjacent zone and the second adjacent zone in order to select the current gameplay scenario.

16. The system according to claim 15, wherein the at least one tracking camera comprises a plurality of tracking cameras, and wherein each of the plurality of tracking cameras is assigned to capture tracking video of a particular one of the plurality of zones of interest in the venue.

17. The system according to claim 15, wherein the at least one tracking camera comprises an optical tracking module, the optical tracking module being configured to:

extract foreground blobs from frames of tracking video captured by the at least one fixed tracking camera;

determine locations of the foreground blobs based on their positions within the frames of the tracking video; and transmit coordinates of the locations of the foreground blobs to the processing system, said coordinates being transmitted without also transmitting the tracking video to the processing system.

18. The system according to claim 15, further comprising a scoreboard camera operatively coupled to the processing system, the scoreboard camera being configured to capture scoreboard video of a scoreboard within the venue, and wherein the processing system is further configured to composite the scoreboard video on the broadcastable video.

19. A non-transitory machine-readable medium carrying one or more sequences of instructions which, when executed by one or more processors operatively connected to at least one tracking camera and a remote-controllable broadcast camera in a venue during a sporting event, cause the one or more processors to carry out the steps of:

dividing the venue into a plurality of zones of interest;

optically tracking individual players in the venue by determining respective positions of the individual players within the zones of interest using the at least one tracking camera;

based on the respective positions of the individual players, performing a cluster analysis to identify player groups within the zones of interest;

determining a given one of the zones of interest containing the most number of individual players;

analyzing activity of the individual players and player groups within the given one of the zones of interest to select a current gameplay scenario corresponding to said activity, said current gameplay scenario being selected from a predetermined set of gameplay scenarios; and based on the current gameplay scenario, adjusting a pan, tilt or zoom of the broadcast camera in real-time, thereby changing a field of view of the broadcast camera and capturing the broadcastable video of the sporting event further comprising identifying individual players or player groups transitioning between adjacent zones of interest, and wherein the current gameplay scenario is selected based on a current position, speed, or direction of the individual players or player groups transitioning between the adjacent zones; further comprising predicting a transition of the individual players or player groups between first and second adjacent zones, and wherein the activity of the individual players and player groups is analyzed within both the first adjacent zone and the second adjacent zone in order to select the current gameplay scenario.

* * * * *